(12) United States Patent
Valsecchi et al.

(10) Patent No.: US 10,506,288 B2
(45) Date of Patent: *Dec. 10, 2019

(54) DRM ADDITION AUTHENTICATION

(71) Applicant: PIKSEL, INC., Wilimgton, DE (US)

(72) Inventors: Stefano Valsecchi, Monza (IT); Giorgio Tornielli, Mortara (IT)

(73) Assignee: PIKSEL, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/561,751

(22) PCT Filed: Mar. 24, 2016

(86) PCT No.: PCT/EP2016/056563
§ 371 (c)(1),
(2) Date: Sep. 26, 2017

(87) PCT Pub. No.: WO2016/156206
PCT Pub. Date: Oct. 6, 2016

(65) Prior Publication Data
US 2018/0091857 A1 Mar. 29, 2018

(30) Foreign Application Priority Data
Mar. 27, 2015 (GB) .................................. 1505329.1

(51) Int. Cl.
H04N 21/4627 (2011.01)
G06F 21/10 (2013.01)
(Continued)

(52) U.S. Cl.
CPC ....... H04N 21/4627 (2013.01); G06F 21/105 (2013.01); H04L 9/08 (2013.01); H04N 21/2541 (2013.01); G06F 2221/0759 (2013.01)

(58) Field of Classification Search
CPC ........... H04N 21/4627; H04N 21/2541; H04N 21/2355; H04N 21/8355; G06F 21/105;
(Continued)

(56) References Cited

U.S. PATENT DOCUMENTS 7,149,722 B1 12/2006 Abburi et al.
2008/0114693 A1 5/2008 Jogand-Coulomb et al.
(Continued)

OTHER PUBLICATIONS

International Search and Written Opinion, dated Jun. 20, 2016, European Patent Office.
(Continued)

Primary Examiner — Benjamin R Bruckart
Assistant Examiner — Tien M Nguyen
(74) Attorney, Agent, or Firm — Holzer Patel Drennan

(57) ABSTRACT

There is provided a client device comprising a content protection decoder according to a first standard, comprising: a receiver for receiving an asset associated with content protection; a creation module for creating a content protection for the asset in accordance with the first standard, and including a parameter identifying information additional to the information associated with said standard; an interface for transmitting a request for a license to a license server based on said standard, the request including that parameter, and for receiving a license in response; and a controller for accessing content associated with the asset using the license. There is also provided a license server configured to: receive a license key request in accordance with a standard from a client device; transmit the request to a processing function associated with the standard; receive a parameter associated with the standard from the processing function; parse the parameter to retrieve additional information; process the additional information; access a license in accordance with the standard based on the parsed information; and transmit the accessed license in accordance with the standard to the client device.

18 Claims, 5 Drawing Sheets

(51) Int. Cl.
*H04L 9/08* (2006.01)
*H04N 21/254* (2011.01)

(58) Field of Classification Search
CPC .. G06F 2221/0759; G06F 17/30; G06F 21/10;
G06F 2221/0706
See application file for complete search history.

(56) References Cited

U.S. PATENT DOCUMENTS

| | | |
|---|---|---|
| 2010/0185854 A1 | 7/2010 | Burns et al. |
| 2012/0017282 A1* | 1/2012 | Kang ................ G06F 21/10 726/26 |
| 2012/0291142 A1 | 11/2012 | Seleznev et al. |
| 2013/0167253 A1* | 6/2013 | Seleznev ............ G06F 21/10 726/29 |
| 2014/0020111 A1* | 1/2014 | Wang ................ G06F 21/10 726/26 |
| 2015/0013014 A1* | 1/2015 | Daniel ............... G06F 21/10 726/27 |
| 2015/0193599 A1 | 7/2015 | Burns et al. |

OTHER PUBLICATIONS

Search Report under Section 17(5), dated Aug. 26, 2016. Intellectual Property Office, Great Britain.
Examination report for European Application 16713370.1, dated Mar. 4, 2019.

* cited by examiner

DRM ADDITION AUTHENTICATION

BACKGROUND TO THE INVENTION

Field of the Invention

The invention relates to the provision of information in handling the decrypting of an asset having content protection associated therewith in order to authenticate access to the asset.

Description of the Related Art

The common encryption (CENC) protection scheme specifies standard encryption and key mapping methods that can be utilized by one or more digital-rights management (DRM) systems to enable decryption of an asset, such as a video file, using different DRM systems such as PlayReady, Marlin, Widevine or other encryption protocols supporting the CENC scheme.

The scheme operates by defining a common format for the encryption-related metadata necessary to decrypt the protected streams, yet leaves the details of rights mappings, key acquisition and storage, DRM compliance rules, etc., up to the specific DRM system or systems supporting the CENC scheme.

The CENC standard specifies three core elements:
1. The encryption algorithm used.
   In particular CENC requires the use of the Advanced Encryption Standard, Federal Information Processing Standards Publication 197, FIPS-197 published by the United States National Institute of Standards and Technology (NIST) using 128-bit keys in Counter Mode (AES-CTR), as specified in "Recommendation of Block Cipher Modes of Operation", NIST, NIST Special Publication 800-38A.
2. How to signal in the asset file that the file itself is encrypted.
3. Where to store the encryption related metadata necessary to decrypt the protected asset file.

More precisely, the encryption related metadata necessary to decrypt the protected files or streams consists in turn of at least the following elements:
1. Protection System Specific Data.
   This data is opaque to the CENC Common Encryption Scheme. This gives protection systems a place to store their own data using a common mechanism. This data is contained in the Protection System Specific Header (PSSH) Box.
2. Common encryption information for a media track, group of samples or individual samples.
   These include default values for the key identifier (KeyID), initialization vector size, and encryption flag.

An asset encrypted according to the CENC scheme may contain more than one PSSH header, e.g. one for each DRM system that is planned to be used for decrypting the asset. For instance, when the asset is encrypted, it is possible to include a PSSH header for PlayReady and a PSSH header for Widevine: in this way the same asset can be equally decrypted when it is received either by a PlayReady or by a Widevine DRM system.

This flexibility can be, for instance, exploited by a video player running in a client device such as a tablet, a laptop or a SmartTV for deciding at the time of decryption which DRM system to use based on criteria such as availability of DRM systems on the specific client device (e.g., a client device could support only a well-defined DRM system such as PlayReady) or, in the case more than one DRM system is available, on DRM costs (e.g., one DRM system being cheaper than another DRM system).

A video player must send a license request to a license server which includes information about which video the license request refers to. In a CENC enabled DRM system, the PSSH header is the data structure that is included in the license request and that will be used by the license server to extract the information it requires to process the request.

There are two different identifiers that are normally used to identify a video:
1. KeyID
   This is the public part of encryption secrets used to encrypt the video (in the AES—advanced encryption standard—algorithm the encryption key is also used to decrypt the video).
2. ContentID
   This is the identifier that uniquely identifies a video asset.

The two may differ, for instance, in the case different segments of the same video asset have been encrypted using different encryptions keys.

Different DRM systems use either one or the other or both to extract from an encryption keys store a secret part of an encryption key that is then included in the DRM license that is eventually sent back to the video player.

For instance, PlayReady uses the KeyID value to extract from the key store the secret part of an encryption key. Widevine uses the ContentID for the same purpose.

The PSSH header for different DRM technologies only include the piece of information they need. Thus a PlayReady PSSH header contains the KeyID but not the ContentID, and a Widevine PSSH header contains both the KeyID and the ContentID.

The majority of current services are based on Smooth-Streaming with PlayReady content protection (HSS/PR).

However some browsers, such as Chrome, do not provide support for PlayReady. At present, Chrome only supports assets which are in the MPEG-DASH format protected with Widevine (according to the common encryption scheme). However existing OTT (over-the-top) content services have a large catalogue of on-demand assets based on Smooth-Streaming with PlayReady content protection.

In some situations it may happen that the encrypted video received in a video player contains PSSH headers for DRM systems that are not supported in the client device. For instance, it may contain the PSSH header for PlayReady but not for Widevine whilst the client device only supports Widevine. In this case, a basic implementation of a video player will not play the video because the client device does not have the necessary information required to engage the correct DRM system.

The authentication procedure refers to the procedure by which a user device obtains a license to allow content to be accessed (e.g. for a video to be played). In some situations the authentication procedure may be adjusted if additional information can be taken into account in the authentication procedure, than just the information which is associated with a given content protection format used by a received asset.

It is an aim of the invention to provide an improvement which addresses one or more of the above-stated problems.

SUMMARY OF THE INVENTION

There is provided a client device comprising a content protection decoder according to a first standard, comprising: a receiver for receiving an asset associated with content protection; a creation module for creating a content protection for the asset in accordance with the first standard, and including a parameter identifying information additional to the information associated with said standard; an interface for transmitting a request for a license to a license server based on said standard, the request including that parameter, and for receiving a license in response; and a controller for accessing content associated with the asset using the license.

There is provided a license server configured to: receive a license key request in accordance with a standard from a client device; transmit the request to a processing function associated with the standard; receive a parameter associated with the standard from the processing function; parse the parameter to retrieve additional information; process the additional information; access a license in accordance with the standard based on the parsed information; and transmit the accessed license in accordance with the standard to the client device.

There is provided a method of generating a license request in a client device, comprising: a receiver for receiving an asset associated with content protection; a creation module for creating a content protection for the asset in accordance with the first standard, and including a parameter identifying information additional to the information associated with said standard; an interface for transmitting a request for a license to a license server based on said standard, the request including that parameter, and for receiving a license in response; and a controller for accessing content associated with the asset using the license.

There is provided a method of generating a license in a license server, comprising: receiving a license key request in accordance with a standard from a client device; transmit the request to a processing function associated with the standard; receive a parameter associated with the standard from the processing function; parse the parameter to retrieve additional information; process the additional information; access a license in accordance with a standard based on the parsed information; and transmit the accessed license in accordance with the standard to the client device.

There is provided a video player implementation that goes beyond the prior limitation, and is able to play a video even if not all the information for content protection is readily available.

A video player is able to translate the assets on-the-fly, for example from HSS/PR to DASH/WV (CENC).

DESCRIPTION OF THE FIGURES

The invention is described by way of example with reference to the accompanying figures, in which.

DESCRIPTION OF THE PREFERRED EMBODIMENTS

In general, a video player is provided which generates on-the-fly, additional information to be included in a license request. A license server is able to detect a request containing the additional information and operate accordingly.

Figure 1:
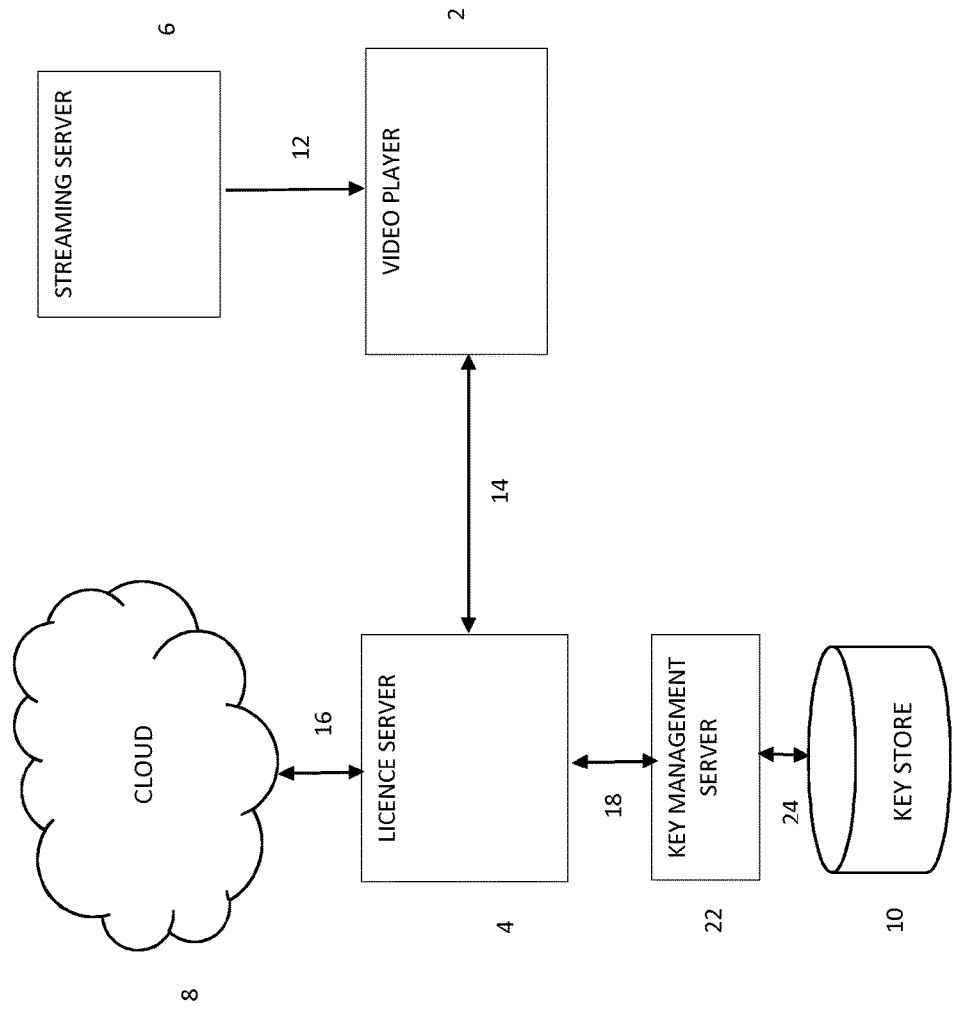
FIG. 1 illustrates an exemplary architecture in which examples may be implemented.

With reference to FIG. 1 there is illustrated an example architecture comprising a video player 2, a license server 4, a streaming server 6, a cloud 8, a key management server 22, and a key store 10. The streaming server 6 delivers assets comprising videos on a communication line 12 to the video player. In order to access the videos, the video player communicates on communication lines 4 with the license server 4 to obtain decryption information for decrypted video content. The license server 4 communicates on communications lines 16 with the cloud 8, and on communication lines 18 with the key management server 22. The key management server 22 communicated with the key store 10 on communication lines 24.

An example based around the example architecture of FIG. 1 is now described.

In this example the video player 2 is further illustrated with reference to FIG. 2, and includes: an encrypted media enhancement module 26 including an interface block for receiving asset and asset manifest data 32, a search engine 34, and a data addition block 36; a content decryption module 28; and a content visualization module 30. The encrypted media enhancement module receives the signal on communication lines 12, and generates a license on line 38 and encrypted video on line 40 the module 28. The module 28 delivers clean video on line 42 to the module 30. The module 26 generated signals on lines 14a of communication lines 14, and receives signals on line 14b of communication interface 14.

The license server 4 is, in this example, a Widevine license server. Widevine is a digital rights management (DRM) standard. The Widevine license server 4 is further illustrated with reference to FIG. 3, and includes a parsing module 44. The signals received on line 14a on communication interface 14 are received by the parsing module 44 and also transferred to lines 16a for transmission to the cloud. Signals received from the cloud on line 16b are received by the parsing module 44. The parsing module 44 generates signals on line 18a to the key management server 22. Signals received from the key management server 22 on lines 18b are passed to the cloud on lines 16c. Signals received from the cloud on lines 16c are passed to the video player on lines 14b.

In this example, the streaming server 6 provides a video asset on communication lines 12 which is formatted in accordance with the MPEG-DASH (moving picture expert group-dynamic adaptive streaming over hypertext transfer protocol) video format. An MPEG-DASH manifest for the video asset is also provided. The video asset may be formatted with any content protection standard, such as PlayReady or Widevine.

In accordance with this example, the video player generates on-the-fly a Widevine header to be included in a request to the Widevine license server 4, following receipt of a video asset which is provided with or without Widevine content protection.

The Widevine header in the request is created with information extracted from the available content protection information in the video player for the received video asset, and additional information. The Widevine header generated in this way may be only partially complete because not all the necessary information may be available from the content protection information in the video player if the video asset does not have Widevine content protection. When this happens, the Widevine license server is able to detect a request containing an incomplete Widevine header, and operate accordingly to provide for the video asset to be decrypted.

Figure 2:
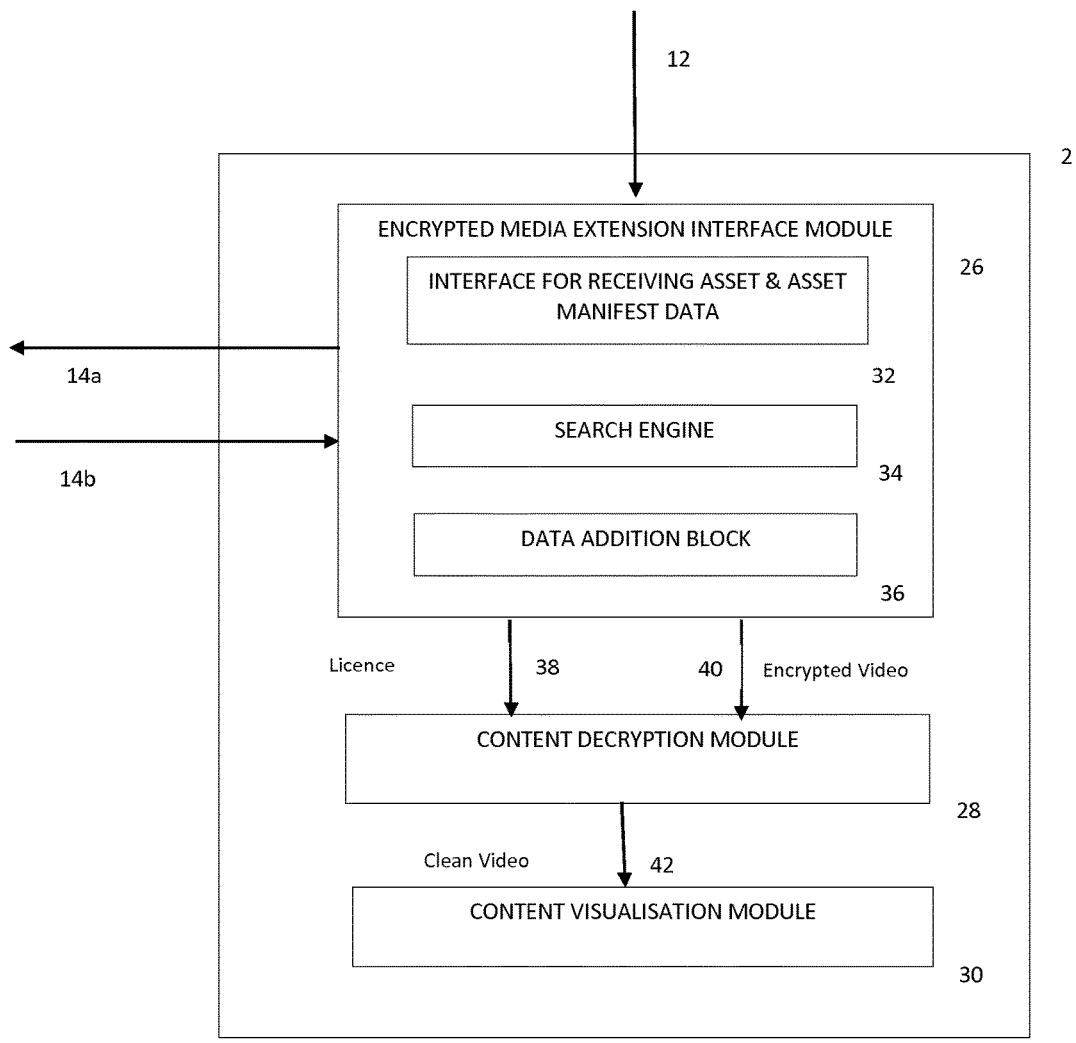
FIG. 2 illustrates an exemplary implementation of a video player in accordance with an example.

The video player 2 in this example runs in a browser implementing an encrypted media extension (EME) interface as illustrated by module 32 in FIG. 2, which may be an application program interface (API) that is part of the hypertext markup language version 5 (HTML5) standard, which is provided to manage encrypted content. This interface permits a query to be made to an underlying browser implementation for verifying which digital rights management (DRM) technology is supported. Standard APIs are available to determine on which browser the video player 2 is running. The provision of such an EME interface is known. In this example it is assumed that there is an encrypted media extension interface, but this example can be generalized to other contexts, such as native Android applications that do not use EME.

The manifest for an encrypted MPEG-DASH asset contains a content protection tag for each of the DRM technologies it supports. This content protection tag defines the DRM technologies with which the asset is encrypted. Optionally the manifest may also contain a generic content protection tag not associated with any specific DRM technology, but defining an encryption applied to the MPEG-DASH asset.

Each content protection tag may define any DRM technology used, and also may contain additional fields with respect to the identifier of the specific technology the tag refers to, such as the asset key field—known as the KeyID field—used for encrypting that asset. The KeyID field is the access key field associated with the content protection technology, and all content protection technology is provided with a KeyID field. The access key is used to retrieve an encryption key which is used to decrypt the encrypted content in the license server.

In this described example, the video player 2 is running in the Chrome browser. The Chrome browser only supports Widevine DRM technology. However the MPEG-DASH manifest may not include a content protection tag for Widevine. As such, the video player is not able to obtain the KeyID to access the encrypted key for decrypting the encrypted asset, as the Widevine decryption technology provided by the video player cannot decrypt the asset which is not encrypted with Widevine.

In this example, the video player 2 is adapted such that a Widevine header is generated for the asset, and the thus generated Widevine header is used to access the Widevine license server to allow the asset to be decrypted.

A Widevine header is required to include both a KeyID field and a ContentID field. Thus the generation of the Widevine header must take into account that a Widevine header must include these two mandatory fields: (i) the KeyID field which is the public part of the encryption secret; and (ii) the ContentID field which identifies the asset.

The ContentID field is used to transmit additional information from the video player to the license server. Where the video player receives an asset which is associated with Widevine protection technology, there is no requirement to generate a Widevine header. However the existing Widevine header may be modified to include the additional information in the ContentID field.

The additional information may be, for example, a user identification or a device identification.

In an example where the protection of the video associated with the asset does not have a Widevine header, a Widevine header is generated starting from information available in the video player.

The essential information that the video player 2 needs in order to generate a Widevine header is the KeyID, and thus the KeyID is retrieved from the received asset manifest. The video player 2 is, in this example, adapted to search in a number of places to locate the KeyID.

Figure 4:
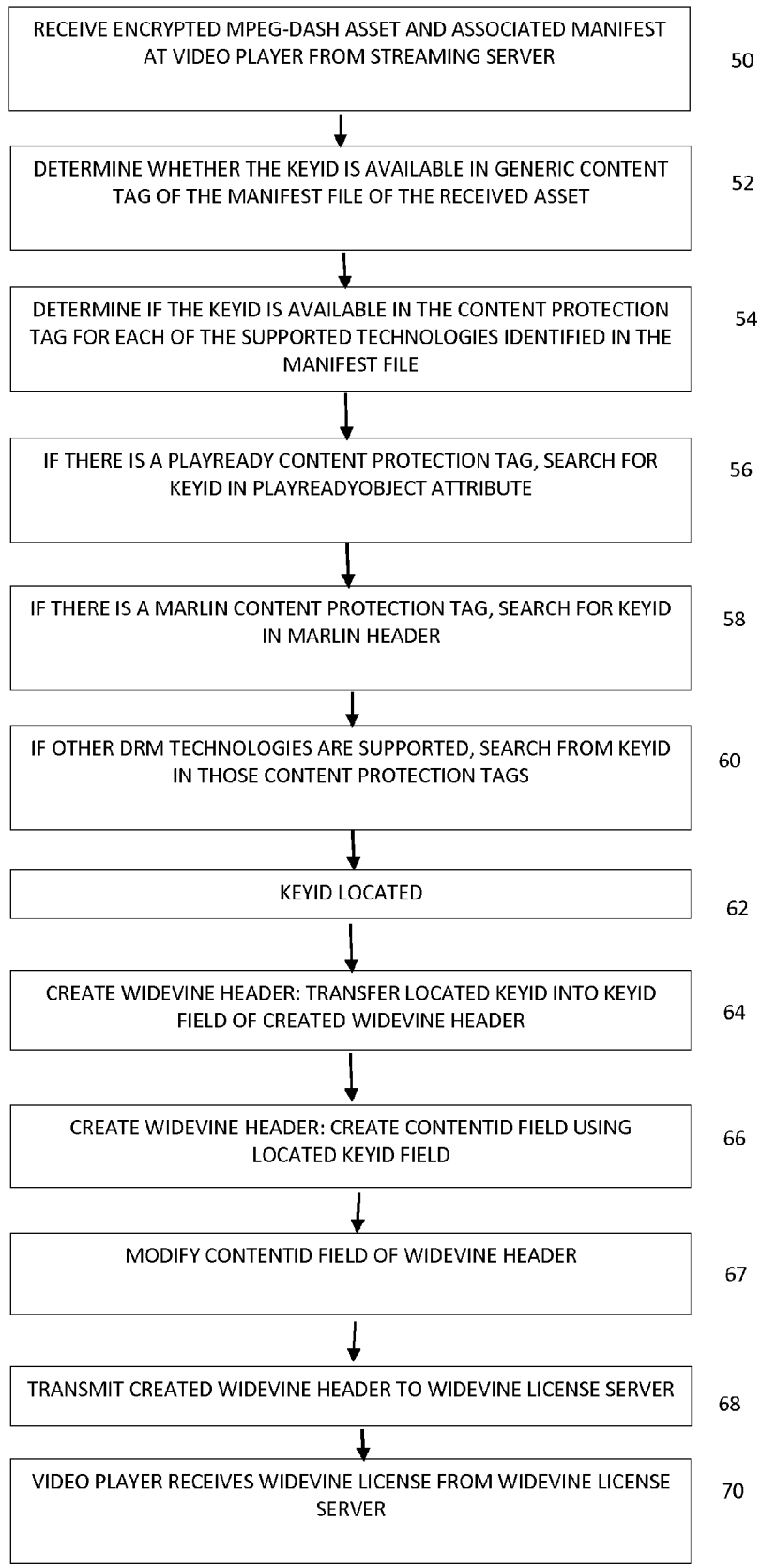
FIG. 4 illustrates an exemplary process in a video player in accordance with an example.
Figure 5:
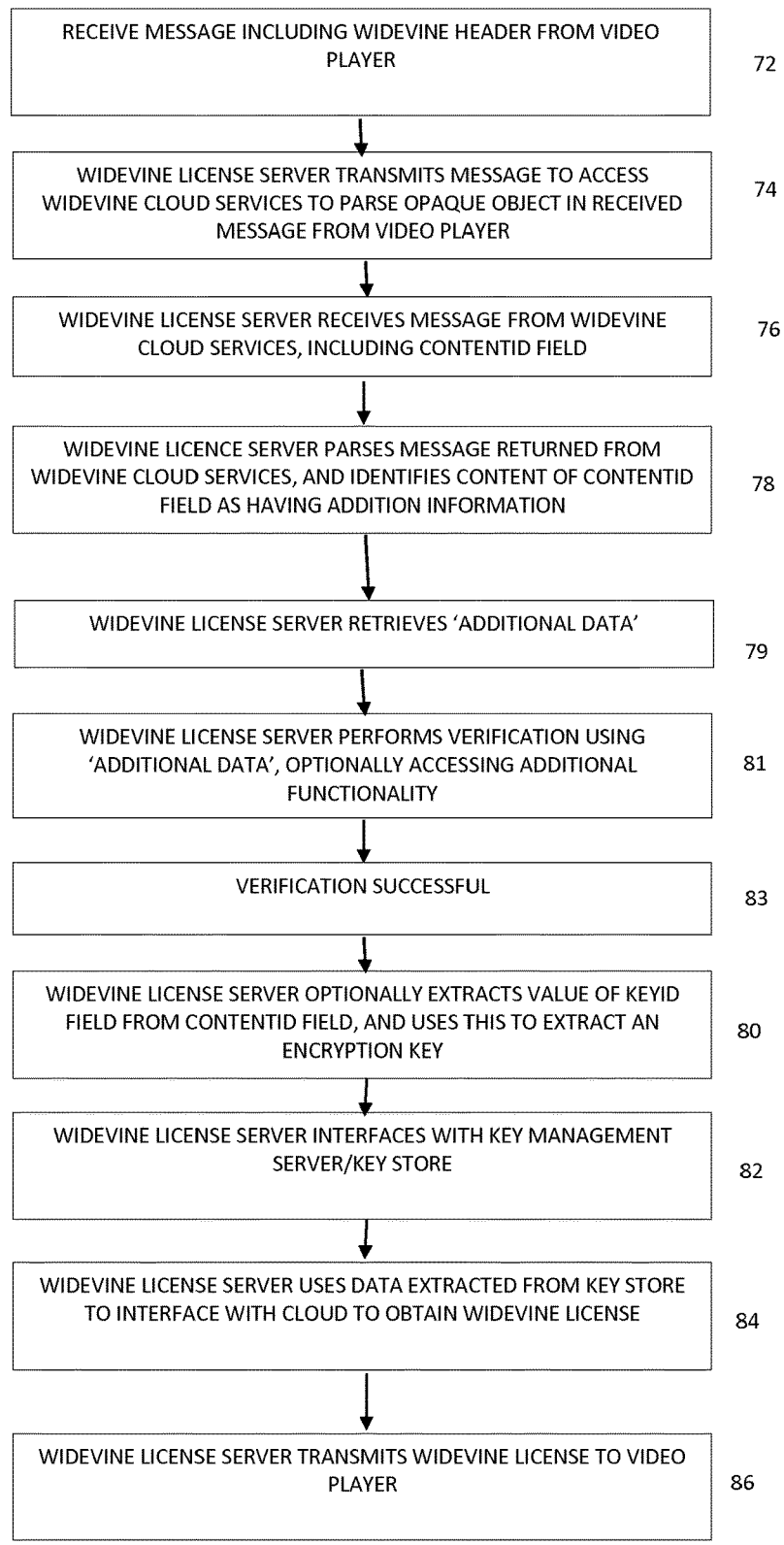
FIG. 5 illustrates an exemplary process in a license server in accordance with an example.

This example if described further with reference to the process flows of FIGS. 4 and 5, which illustrate the process steps carried out in the video player 2 and the Widevine license server 4 respectively.

In step 50 of FIG. 4 the video player receives the video asset on line 12, together with the associated manifest.

After receipt of the video asset, the search engine 34 of the video player uses the asset manifest to search for the KeyID.

Initially, the video player 2 determines whether the KeyID is available in the generic content tag of a manifest file of the received asset, if this generic content protection tag is available. This is denoted by step 52 in FIG. 4.

If the generic content protection tag is not available, or if the KeyID is not found in it, then a search is conducted for a content protection tag for each of the supported technologies identified in the manifest file of the received asset. This is denoted by step 54 in FIG. 4.

If the KeyID is not located in any of those tags, it is determined if there is a PlayReady content protection tag associated with the received asset. PlayReady is a known DRM format. If there is a PlayReady content protection tag, it is searched in the PlayReadyObject Attribute of the PlayReady content protection tag containing the PlayReady header. The PlayReadyObject attribute is mandatory in a content protection attribute for PlayReady. This is denoted by step 56 in FIG. 4.

If there is no content protection attribute for PlayReady, but there is one for Marlin, the KeyID is searched in the (partial) Marlin header that is contained in the 'content protection' tag for Marlin. Marlin is a known DRM format. This is denoted by step 58 in FIG. 4.

If other DRM technologies are supported, then the search for the KeyID may be extended to those content protection tags as well. This is denoted by step 60 in FIG. 4.

Following this search process, the KeyID field in the manifest file associated with the received asset is located. This is denoted by step 62 in FIG. 4.

Once the KeyID is located, a Widevine header can be created utilizing the Widevine header creation block 36 of FIG. 2, with the two fields KeyID and ContentID both populated. The creation of the Widevine header involves transferring the located KeyID field to a KeyID field of the created Widevine header as denoted by step 64 of FIG. 4, and a creating a ContentID field using the KeyID field as denoted by step 66 of FIG. 4. The syntax format of the created ContentID field will indicate that it is not a 'proper' ContentID field when it is subsequently parsed (as described below). The actual content of the KeyID field and the ContentID field of the created Widevine header will be the same, but the syntax of the two fields is different. The syntax used to create the ContentID field will be implementation dependent.

The video player 2 is thus modified in order to allow the Widevine header to be created based on the KeyID in the manifest file associated with the incoming asset, where the incoming asset is not associated with Widevine content protection.

The video player 2 then transmits on communication lines 14 a message to the Widevine license server 4.

Where the incoming asset is associated with Widevine content protection, a Widevine header exists and does not need to be created.

Where the Widevine exists, or is created as described, the ContentID field is further modified to include additional data. This additional data may be any other information, such as a device identity or a user identity.

The structure of the ContentID field is thus extended to include a structured object such as:

_KeyID=< . . . >?UserID=< . . . >?DeviceID=< . . . >?

In this way it is possible to send any additional data from the video player to the license server.

This additional data can, for instance, be data that can be used by the license server for verifying if the end-user has the rights to receive the license.

The additional data may be used in order to permit the license server to perform all the verification checks necessary to determine if a license to access content should be provided. This allows all the verification checks to be performed by the license server, and the video player does not have to perform any checks. In addition the license server may perform additional checks than it would otherwise do. Thus, for example, all the verification checks for an end-user to watch a given video may be performed by the license server, with any additional information needed to perform such checks being additionally included in the header sent to the license server. The license server only returns a license to the video player if all the checks it performs are successful.

The license server must receive all the information that is needed to perform such checks, and where the information is not ordinarily included in the header sent to the license server, it may be included as this additional information. This additional information may be user identity, device identity, time of day, user location, and anything necessary to verify those rights. The additional information included is the information that is needed to support further verification checks which will be performed at the license server. The information that is necessary will depend on the business model of the over-the-top service—which for example may sell subscriptions at a discounted price for off-peak access, and therefore verification of the time day will be necessary.

By including the additional information, a verification check which may have previously been performed by the video player can be performed by the license server, or a verification check that may not have previously been able to be performed may be now performed.

Depending on the content protection this additional data may be part of the PlayReady protocol. For example in PlayReady additional data is referred to as custom data. Widevine content protection does not natively support a similar concept. This exchange of information is normally implemented outside of the DRM exchange where Widevine content protection is used.

Thus where the Widevine header is created due the content protection of the received asset not being Widevine, the additional data/information entered into the ContentID field of the created Widevine header can include additional encryption data which is in the original header (such as the PlayReady header) and which cannot otherwise be incorporated into a Widevine header.

With the described modification, it is achieved using Widevine content protection and, hence the cryptographic security that is offered by the Widevine protocol can be exploited.

This modification of the Widevine header is denoted by step 67 in FIG. 4.

The completed message is transmitted to a URL determined by the video player 2. The PlayReady header also contains the URL of a PlayReady license server. This URL can be used to derive the Widevine license server URL in the case the latter can be automatically derived from the former. For instance, assuming the URL of the PlayReady licenser server is http://Guard.piksel.com/playready and the URL of the Widevine licenser is http://Guard.piksel.com/widevine/, it is clear that the transformation can be easily achieved. When this is not the case, it is assumed that the video player knows the necessary URL. The Widevine header is thus transmitted to the license server in accordance with the URL. The license server URL is needed to engage the correct License Server, but it does not need to be included as part of the Widevine PSSH header.

The message to the Widevine license server is a Widevine license request consisting of an opaque binary object. The generation of this message from the video player to the Widevine license server, using the created Widevine header as denoted by step 68 in FIG. 4, is in accordance with the Widevine standard. This message may include the Widevine header plus additional information. However this message is in accordance with Widevine standard, and no modification is made to its format. The receipt of this message by the Widevine license server is indicated by step 72 of FIG. 5.

Figure 3:
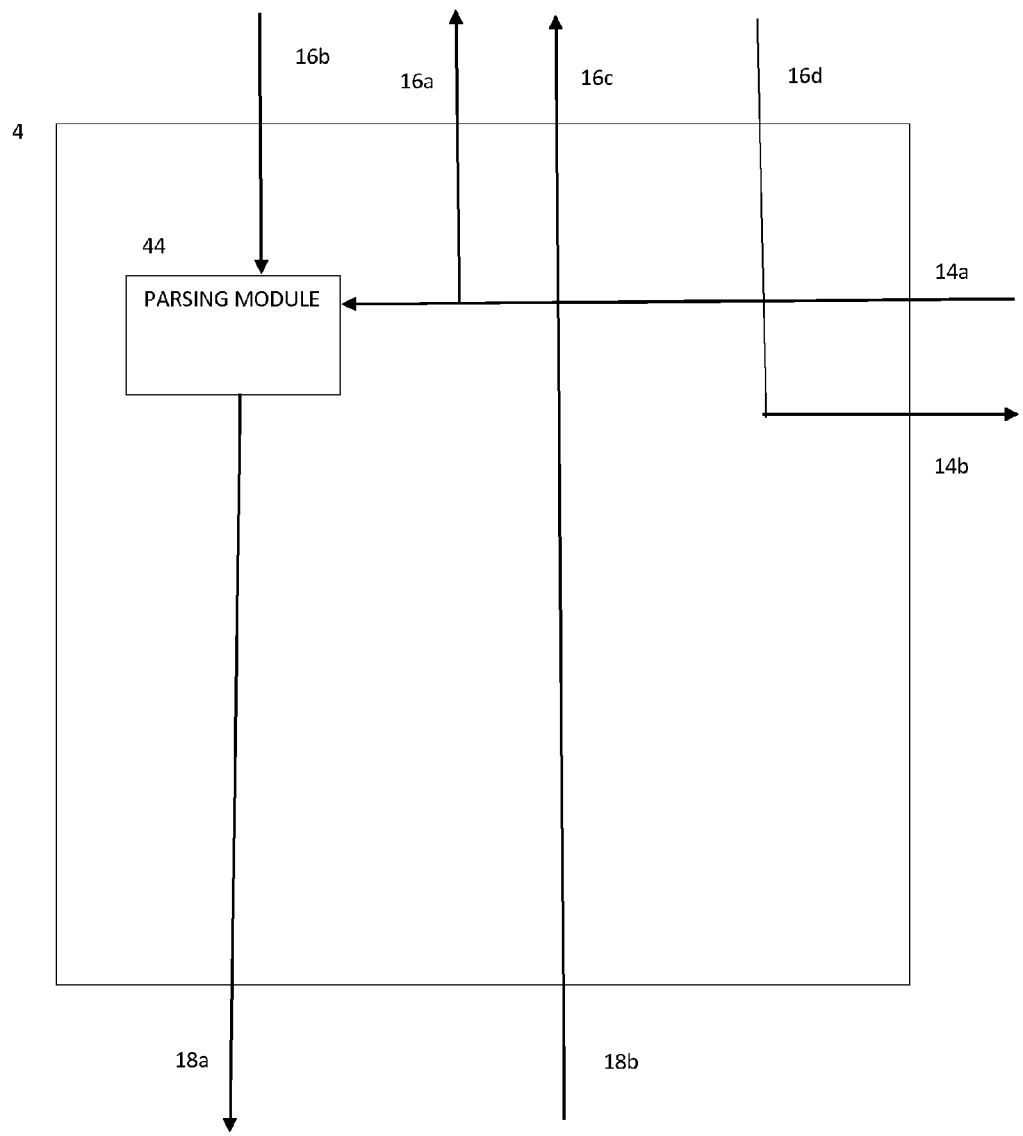
FIG. 3 illustrates an exemplary implementation of a license server in accordance with an example.

Because this message comprises an opaque object, the Widevine license server 4 cannot use it directly. Rather, the Widevine license server 4 has to call-up a further service provided by the Widevine cloud, which services are termed 'ParseOnly'. Thus the Widevine license server 4 communicates with the cloud 8 on communication lines 16, and transmits the message from the video player 2 on communication lines 14a to the cloud on communication lines 16a as shown in FIG. 3, to an appropriate address in the cloud for parsing. The address in the cloud 8 which the message is sent to may be associated with Widevine cloud services, and in general is an address which provides parsing functionality associated with Widevine services and the Widevine protocol. This is illustrated by step 74 in FIG. 5.

The address in the cloud has the specific purpose to provide processing functionality to interpret the opaque object in accordance with the Widevine protocol, and return it—or part of it—back to the Widevine license server 4. The KeyID is not returned by the cloud to the Widevine license server 4.

A Widevine DRM server could also be implemented in a way that does not require Widevine cloud services. For example it could be implemented using a specific SDK (software development kit) provided by Widevine permitting local implementation of the functions that are provided by the Widevine cloud service at the Widevine license server 4. In this case, the Widevine cloud services are not engaged. However the parsing of the opaque object part of the Widevine license request received from the video player is still done by software provided by a Widevine service, and the information returned to the Widevine license server is the same.

In summary the Widevine license server 4 receives in the message on line 14 from the video player 2 an opaque binary object that includes the Widevine header plus additional data, which is sent to the cloud services for interpretation.

The dialog between the Widevine license server and the Widevine cloud services are based on a standard protocol defined by Widevine.

The Widevine cloud returns a message on line 16b to the Widevine license server, as denoted by step 76 in FIG. 5. This returned message includes the ContentID field to the Widevine license server 4, but not the KeyID field. The ContentID field has been modified by the video server, as described above, to include additional information.

This message is received by the parsing module 44 of the Widevine license server, and as denoted by step 78 the Widevine license server 4 parses the value of the ContentID field.

The parser module 44 recovers the additional data included in the ContentID field, with knowledge of any syntax used to include the additional data. This is denoted in FIG. 5 by step 79.

Once the additional data is retrieved, it may be used in order to perform additional verification (authentication) checks before the standard process for accessing encryption keys to obtain a license is performed.

The license server may be configured to perform the verification checks on the additional information, or the license server may be configured to communicate with an additional server. Such as an entertainment server, to provide the additional information for the additional verification to be carried out.

As denoted by step 81 in FIG. 5, the license server thus performs additional verification checks using the additional data, which may involve communication with an additional resource (such as the entertainment server).

The verification checks will be implementation dependent, and may relate for example to limiting the license to only be provided for access to content at a certain time of day or in a certain location. In general the verification can be anything that is necessary to watch the video associated with the license request on that device, in a particular location (home, outdoors etc.), at a particular time of day etc.

As denoted by step 83, it is assumed that the verification is successful. If the verification is not successful, then the process terminated here: a license will not be granted.

Where the Widevine header is also a translation of a header associated with some different from of content protection, the parser module 44 recognizes this owing to its value being formatted according to a known syntax, meaning that it represents a KeyID instead of a 'proper' ContentID. Based on this, the Widevine license server extracts from the ContentID field the value of the KeyID that is embedded in it. This is denoted by step 80 in FIG. 5. This KeyID is then used to extract an encryption key.

When the verification is successfully completed, and the encryption key is obtained (with a normal key recovery or by recognising the format of the ContentID field), the authentication process to obtain a license continues in accordance with a standard process.

The implementation of a Widevine license server 4 in this example separates two functions: the key management server (KMS) 22 and the license server itself. The KMS 22 is in charge to negotiate the encryption keys with the scramblers and to store those keys (actually a triplet <contentID, keyID, keySeed>) in the database of the key store 10. The Widevine license server is in charge to receive a license request from a video player, evaluate the requests and possibly return a DRM license back to the video player. As part of this process, the Widevine license server 4 gets from the KMS the KeySeed corresponding to the KeyID field or ContentID field of interest.

The KMS 22 and the Widevine license server 4 are separate services that can be located in different network locations. As shown in FIG. 1 the license server and the KMS 22 are connected by communication lines 10.

The Widevine license server 4 thus uses the encryption key extracted from the KeyID to extract key secrets from the key store 10 via the KMS 22, as denoted by the transmission of the message on line 18a in FIG. 3 and the receipt of a message on line 18b. This is also denoted by step 82 in FIG. 5.

The encryption secrets extracted from the key store 10 (keyID, contentID, keySeed) are then sent, together with default license properties, by the Widevine license server to a Widevine service (either locally available or offered by the Widevine Cloud Service via communication lines 16) in charge to create the actual Widevine license on line 16c. The latter is returned to the Widevine license server on communication lines 16d. This is denoted by step 84 in FIG. 5.

The Widevine license server 4 then returns the license on communication lines 14b to the video player, as denoted by step 86 of FIG. 5.

As denoted by step 70 in FIG. 5 the Widevine license is received by the video player, and used by the content decryption module 28 to provide a clean video signal on line 42 to the content visualisation module.

A specific example is the case of an asset being provided which comprises video content, which content is protected by PlayReady content protection technology. Only a PSSH header for PlayReady is available with the asset.

A client device (video player 2) receiving this asset is only provided with a Widevine encryption decoder, and therefore only supports the decryption of any asset which is protect with Widevine content protection technology.

The video player is adapted to generate, on receipt of the asset, a Widevine PSSH header on-the-fly from the PlayReady PSSH header. The translation is on-the-fly in the sense that it is performed by the video player as and when it receives an HSS/PlayReady asset.

The PlayReady header contains, among other fields, the KeyID field. The PlayReady header does not contain a ContentID field. A Widevine PSSH header is required to include both a KeyID field and a ContentID field. Thus the generation of the Widevine header must take into account that a Widevine header must include these two mandatory fields: (i) the KeyID field which is the public part of the encryption secret; and (ii) the ContentID field which identifies the asset.

The Widevine header is created starting from information available in the PlayReady header. The KeyID field in the Widevine PSSH header is created by filling it with the value of a homonymous KeyID field extracted from the PlayReady PSSH header.

The ContentID field in the Widevine PSSH header created by filling it with a value obtained by the concatenation of a known string such as "KeyID=", and the value of the KeyID field extracted from the PlayReady PSSH header. Thus the ContentID field is filled with the value of the KeyID field, but following a specific syntax. The known syntax may be of the form: _KeyId=< . . . the keyID value . . . >. After this step both the KeyID field and the ContentID field created in a Widevine PSSH header contain the same information but in different formats.

The PlayReady PSSH header includes other information fields, which additional information fields are not relevant for the described translation.

Other mandatory information that must be included in a Widevine PSSH header is created from the PlayReady PSSH header. This may be, for example: the name of the license (DRM) service provider; or the value of the flag specifying that the video is encrypted. This information is assumed to be known, and may be derived directly from the PlayReady PSSH Header and placed in the created Widevine PSSH header.

In addition the ContentID field is adapted/configured to include additional information.

After the Widevine header is created, the video player transmits a message to a license server requesting the license for the video asset as described above.

Thus in a three step process: (i) the PlayReady PSSH header is translated into a Widevine PSSH header (according to the common encryption scheme); (ii) additional information is included in the Widevine ContentID field; and (ii) the Widevine header that is required in the CENC file for triggering a request to a Widevine license server is generated by the video player using the information available in the PlayReady header.

This example has the benefits that: (i) there is no need to change anything in the streaming server side; and (ii) there is no need to re-encode/re-encrypt any asset.

The technique is advantageously utilized to translate from HSS/PR to Dash/PR (CENC), but is not limited to this.

The specifications for HSS, MPEG-DASH and CENC are public.

As discussed above, the ContentID is returned by the cloud services to the license server, after the WideVine header is parsed. Because the WideVine header is encrypted according to the Widevine protocol, it is completely opaque to the Widevine license server in accordanance with standard techniques. Therefore, the license server sends the header to the Widevine services in the cloud for interpretation. At this stage, the Widevine license server has not identified the header.

The Widevine cloud services only return the ContentID field to the DRM server after parsing. The Widevine license server parses the string representing the ContentID returned from the cloud services and, if it represents a KeyID instead of the ContentID, this is recognised by the Widevine license server.

The Widevine license server also recovers from the ContentID filed any additional data/information which has been added therein by the video player.

As described above, the keySeed is then extracted from the encryption secrets database using the KeyID instead of the ContentID based on the identification.

The normal behavior of a Widevine license server would be to extract the encryption secrets by ContentID. However based on the returned parsed ContentID field, the Widevine license server recognizes that the format of this data in not in accordance with the standard format of a ContentID field, and further processes accordingly.

In summary, therefore, the following steps are implemented:

A header of a desired DRM system is constructed starting from the information in the available PSSH header.

A field of the header is modified to include additional information.

The URL of the license server is either derived from the available information associated with the received asset or it is otherwise known to the video player.

The license server extracts an encryption secret either by KeyID or by ContentID, and this is used to access a key store to thereby obtain the necessary license.

The license server can obtain additional information is the modified header.

As set out above it is possible to generate a Widevine header starting from the header of any DRM technology. For instance, it is possible to generate a Widevine header starting from a Marlin header. The only requirement is that the DRM header input to this process contains the value of the KeyID. This is always the case for assets encrypted using the Common Encryption scheme.

This example describes how to interpret CENC/PlayReady encrypted content using Widevine. The same technique could be used to do the opposite, i.e. to interpret Widevine encrypted content using PlayReady. In general other combinations, based on the same principle, could be developed.

Whilst in general the opposite translation is possible, the header of other technologies may contain additional fields that cannot be readily derived from the Widevine header (e.g., PlayReady headers contains a field SystemID—an identifier identifying the content owner/OTT service known to Microsoft). In this case, the missing information must be available in the video player in advance.

Whilst the examples above discuss generating a Widevine header for an asset having content protection other than Widevine, and described the opposite translation, in general there may be provided a translation of a header for an asset having any content protection technology to a header of another content protection technology. In general this will be dependent upon there being at least one parameter which will need to be commonly provided in the original header and the translated header, such as the KeyID field for CENC protection schemes. In general, however, there is provided a technique which may be applied to create a header associated with one content protection technology from a header associated with another content protection technology.

The invention has been described by way of examples. The invention is not limited to any aspect of any example. The examples may be combined. Any part of any example may be combined with any part of any other example.

The invention claimed is:

1. A client device comprising a content protection decoder according to a first standard, comprising:
   a receiver for receiving an asset associated with content protection according to a second standard different than the first standard;
   a header creation block for creating a header for the asset in accordance with the first standard, the header including information associated with the first standard and a parameter comprising information additional to the information associated with the first standard;
   an interface for transmitting a request, including the header, for a license to a license server based on the first standard, and for receiving a license in response, wherein the additional information is used for obtaining the license; and
   a controller for accessing content associated with the asset using the license.

2. The client device of claim 1 wherein the first standard is a Widevine digital rights management standard.

3. The client device of claim 2 wherein the creation module creates a Widevine digital rights management header, and the parameter is the ContentID field of the Widevine digital rights management header.

4. The client device of claim 3 wherein the ContentID field comprises information associated with a content protection standard of the received asset, wherein such information is not located in a Widevine digital rights management header.

5. The client device of claim 1 wherein the additional information is for a verification check to be performed by the license server.

6. The client device of claim 1 wherein the additional information includes one of a user identification, a device identification, a time of day, and a location.

7. The client device of claim 1 wherein the receiver receives the asset associated with content protection of the second standard.

8. The client device of claim 7 wherein the second standard is one of a Widevine digital rights management standard, Marlin digital rights management standard, and PlayReady digital rights management standard.

9. The client device of claim 1 wherein the receiver receives the asset as an MPEG-DASH message protected according to the common encryption (CENC) standard.

10. The client device of claim 1 further comprising: a video player, wherein the asset is associated with video content.

11. A method of generating a license in a license server, the method comprising the steps, at the license server, of:
receiving a license key request in accordance with a first standard, being a Widevine digital rights management standard, from a client device;
transmitting the license key request to a processing function associated with the first standard;
receiving a parameter, being the Widevine digital rights management standard, associated with the first standard from the processing function and the parameter is a ContentID field of a Widevine header;
parsing the parameter to retrieve additional information;
performing a verification using the additional data;
in response to a successful verification, retrieving a license in accordance with the first standard based on the retrieved additional information; and
transmitting the retrieved license in accordance with the first standard to the client device.

12. The method of claim 11 wherein the additional information is processed by performing a verification based on the additional information, and the retrieval of the license is dependent on the verification.

13. The method of claim 12 wherein the verification is associated with one of identification of a user, identification of a user device, identification of a time of day, and identification of a location.

14. The method of claim 12, wherein in dependence on the verification based on the additional information being successful, retrieving the license is enabled.

15. A method of generating a license request in a client device providing content protection according to a first standard, the method comprising:
receiving an asset associated with content protection according to a second standard different than the first standard;
creating a header for the asset in accordance with the first standard, the header including a parameter comprising information additional to that associated with the first standard, comprising:
determining that a generic content protection tag is available in a manifest file of the received asset and a KeyID is available in the generic content protection tag;
in response to the determining the generic content protection tag of the manifest file of the received asset or the KeyID in the generic content protection tag is available, then searching for a content protection tag for each digital right management (DRM) supported technology identified in the manifest file of the received asset;
wherein the searching comprises:
determining that there is a PlayReady content protection tag associated with the received asset in the received manifest file;
in response to the determining that there is the PlayReady content protection tag, searching for a KeyID in a PlayReadyObject attribute of the PlayReady content protection tag containing a PlayReady header;
in response to the determining that there is no PlayReady content protection tag, but there is a content protection tag for Marlin in the received manifest file, searching the KeyID in a Marlin header that is contained in the content protection tag for Marlin;
in response to the determining that neither the PlayReady content protection tag nor the Marlin content protection tag is available and there are remaining DRM technologies being supported, extending the search for KeyID in content protection tags corresponding to the remaining supported DRM technologies;
based on the searching, the KeyID in the manifest file associated with the received asset is located;
once the KeyID is located, creating a Widevine header with KeyID and ContentID fields both populated, by transferring the located KeyID to the KeyID field of the created Widevine header, and by creating a ContentID field using the KeyID field;
transmitting a request, including the header, for a license to a license server based on the first standard, the request including the parameter, and for receiving a license in response; and
accessing content associated with the asset using the license.

16. A non-transitory computer readable medium encoding a computer program, which when executed on a computing device, performs the method of claim 11.

17. A non-transitory computer readable medium for storing computer program code which, when executed on a computing device, performs the method of claim 15.

18. A license server, configured to:
receive a license key request in accordance with a first standard, being a Widevine digital rights management standard, from a client device;
transmit the license key request to a processing function associated with the first standard;
receive a parameter, being the Widevine digital rights management standard, associated with the first standard from the processing function and the parameter is a content ID field of a Widevine header;
parse the parameter to retrieve additional information;
perform a verification using the additional data;
in response to a successful verification, retrieve a license in accordance with the first standard based on the retrieved additional information; and
transmit the accessed license in accordance with the first standard to the client device.

* * * * *